(12) United States Patent
Hou (10) Patent No.: US 8,195,190 B1
(45) Date of Patent: Jun. 5, 2012

(54) METHOD AND SYSTEM OF DETERMINING A LOCATION OF A DUAL-MODE DEVICE

(75) Inventor: Jiongkuan Hou, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 899 days.

(21) Appl. No.: 12/133,292

(22) Filed: Jun. 4, 2008

(51) Int. Cl.
*H04W 24/00* (2009.01)
*H04W 4/00* (2009.01)

(52) U.S. Cl. .................................. 455/456.1; 455/432.2

(58) Field of Classification Search ................ 455/456.1
See application file for complete search history.

(56) References Cited

U.S. PATENT DOCUMENTS

| | | | |
|---|---|---|---|
| 7,035,647 B2 | 4/2006 | de Verteuil | |
| 2004/0092271 A1* | 5/2004 | Viikari et al. | 455/456.2 |
| 2004/0162068 A1* | 8/2004 | Lamb et al. | 455/432.1 |
| 2004/0207556 A1 | 10/2004 | Spilker, Jr. et al. | |
| 2005/0113117 A1* | 5/2005 | Bolin et al. | 455/456.6 |
| 2006/0066450 A1* | 3/2006 | Jackson | 340/539.13 |
| 2006/0136557 A1* | 6/2006 | Schaedler et al. | 709/203 |
| 2007/0008129 A1* | 1/2007 | Soliman | 340/572.1 |
| 2007/0210961 A1 | 9/2007 | Romijn | |
| 2007/0281712 A1* | 12/2007 | Povey et al. | 455/456.1 |
| 2008/0293436 A1* | 11/2008 | Fok et al. | 455/456.2 |
| 2009/0160711 A1* | 6/2009 | Mehta | 342/450 |

* cited by examiner

*Primary Examiner* — Lester Kincaid
*Assistant Examiner* — Andy Gu (57) ABSTRACT

A method and system for determining a location of a wireless communication device (WCD) provisioned to operate in (a) a first access network that defines a first plurality of coverage areas and (b) a second access network that defines a second plurality of coverage areas. A location system may receive a request to determine a location of the WCD. In response, the location system may identify (a) a first coverage area of the first access network in which the WCD is located and (b) a second coverage area of the second access network in which the WCD is located. Thereafter, the location system may determine an overlapping area between the first coverage area and the second coverage area. In turn, the location system may determine an indication of the overlapping area's location, which the location system may define as a low precision indication of the WCD's location.

13 Claims, 7 Drawing Sheets

METHOD AND SYSTEM OF DETERMINING A LOCATION OF A DUAL-MODE DEVICE

BACKGROUND

Cellular wireless communication devices (WCDs), such as a mobile phones and personal digital assistants, have become increasingly common in recent years. In general, a WCD communicates over an air interface with a wireless carrier's network, which provides the device with access to other network resources, such as a communication channel to interact with other devices or with network servers.

In a typical wireless carrier network, multiple base stations are positioned throughout a market area, and each base station radiates to define a cell and, in turn, cell sectors, in which WCDs can operate. Air interface communication between a given base station and a WCD may operate in accordance with various air interface protocols, well known examples of which include CDMA (e.g., 1xRTT, 1xEV-DO), iDEN, TDMA, AMPS, GSM, GPRS, UMTS, EDGE, and WiMAX (e.g., IEEE 802.16), among others. One or more base stations are then typically coupled or integrated with a base station controller, which manages air interface operation such as use of air interface channels and handoff of devices between sectors. In turn, one or more base station controllers may be coupled with a switch (e.g., mobile switching center) or gateway (e.g., packet data serving node) that provides connectivity with a transport network such as the public switched telephone network (PSTN) or the Internet. Within this arrangement, a WCD may communicate via a base station, base station controller, and the switch or gateway, with entities on the transport network.

As wireless communication technologies advance, new forms of air-interface communication are developed, and wireless carriers may seek to upgrade or expand their networks to offer the latest technologies to subscribers. Because this upgrade or expansion is usually a gradual process, wireless carriers may operate multiple networks simultaneously for some period of time, with each network employing a different air interface communication technology. In this respect, the access networks may be overlaid upon one another, and may serve WCDs operating in substantially the same market area. As an example, a wireless carrier may operate both a 3G network (e.g., CDMA) and a 4G network (e.g., WiMAX) simultaneously in the same market area for some period of time. During this time, the wireless carrier may then offer their subscribers dual-mode WCDs that are capable of operating in each of the networks.

An important feature of contemporary cellular wireless carrier networks is an ability to locate the geographical position of a WCD. Such a feature was initially developed to assist emergency services in locating a WCD. However, the availability of location information to support E911 services has given rise to the development of many other location-based service (LBS) applications as well. For example, given the location of a WCD, an LBS provider (e.g., a wireless cellular carrier or third party) can provide the WCD's user with information related to that location, such as a weather or traffic report, a list of services or establishments (e.g., restaurants, parks, or theatres), and/or a map of the user's location with directions for travel between the user's location and another location. Many other examples are possible as well.

In practice, when a requesting entity wants to determine the location of a WCD, the entity may send a location request to the wireless carrier that serves the WCD. In one example, the location request may be a "low precision request" that seeks a low precision indication of the WCD's location, such as an indication of the location of the cell/sector in which the WCD is currently located (e.g., the geographic location of the cell/sector's centroid). As another example, the location request may be a "high precision request" that seeks a high precision indication of the WCD's location, such as a more precise indication of the geographic position of the WCD itself (e.g., a geographic location determined using satellite-based positioning data). In this respect, a low precision indication of the WCD's location may be used in determining the high precision indication of the WCD's location. Further, if the determination of a high precision indication of the WCD's location fails, the low precision indication of the WCD's location may be used as a fall back option.

As can be seen, the ability to determine a low precision indication of the WCD's location plays an important role in location determination. Accordingly, an improved location method for determining an accurate low precision indication of a WCD's location is desirable.

Overview

The present invention is directed to methods and systems for determining a location of a wireless communication device (WCD) that is provisioned to operate in (a) a first access network that defines a first plurality of coverage areas and (b) a second access network that defines a second plurality of coverage areas. Preferably, the methods and systems described herein will provide an accurate low precision indication of a WCD's location.

In one embodiment, the present invention may take the form of a method that includes (a) receiving a request to determine a location of the WCD, (b) identifying a first coverage area of the first access network in which the WCD is located and a second coverage area of the second access network in which the WCD is located, (c) determining an overlapping area between the first coverage area and the second coverage area; (d) determining an indication of a location of the overlapping area, and (e) defining the indication of the location of the overlapping area as an indication of the location of the WCD.

In another embodiment, the present invention may take the form of a method that includes (a) receiving a request to determine a location of the WCD, (b) sending a request seeking an indication of the location of the WCD to a first location system coupled to the first access network, (c) receiving from the first location system an indication of a first coverage area of the first access network in which the WCD is located, (d) sending a request seeking an indication of the location of the WCD to a second location system coupled to the second access network, (e) receiving from the second location system an indication of a second coverage area of the second access network in which the WCD is located, (f) determining an overlapping area between the first coverage area and the second coverage area, (g) determining an indication of a location of the overlapping area, and (h) defining the indication of the location of the overlapping area as an indication of the location of the WCD.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

DETAILED DESCRIPTION

Figure 1:
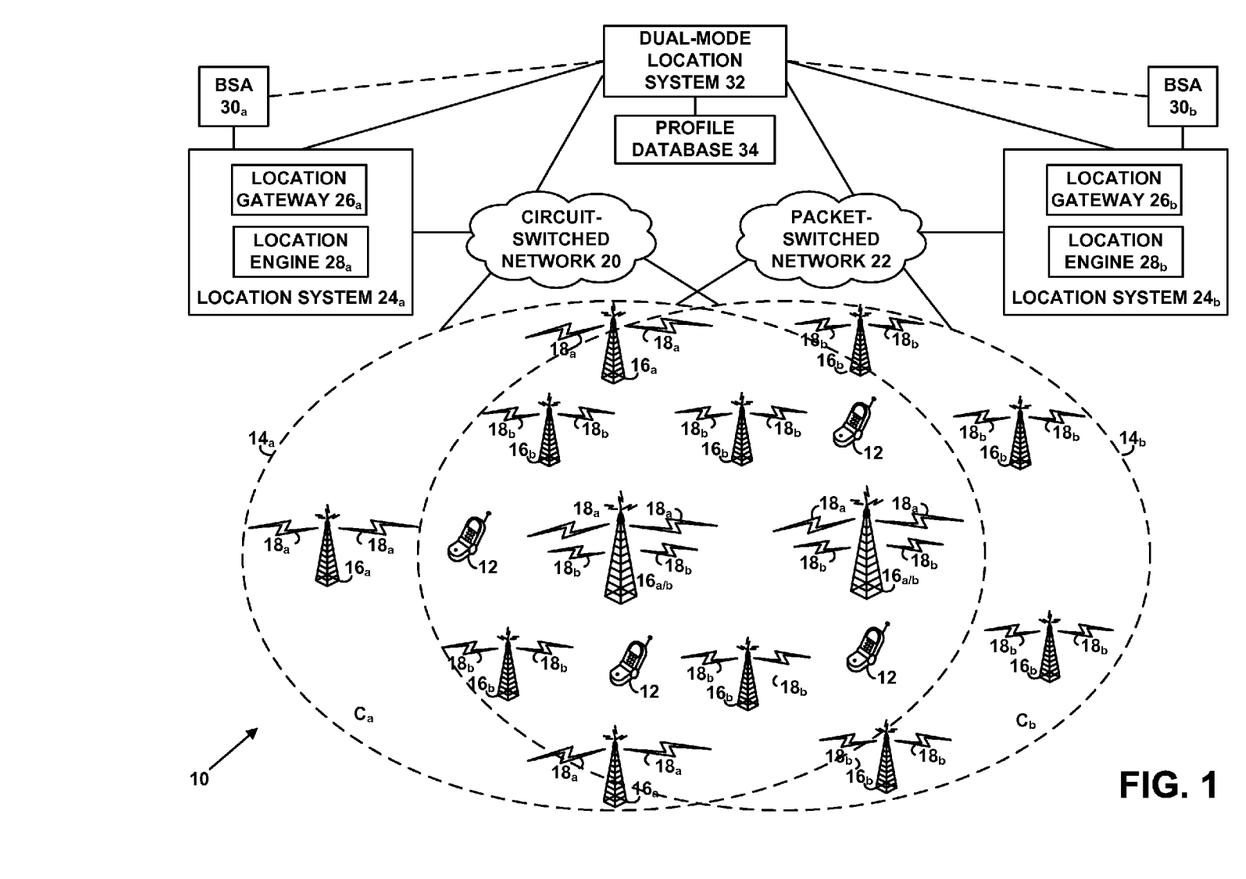
FIG. 1 is a simplified block diagram of a telecommunications system in which an exemplary embodiment of the invention can be implemented.

Referring to the drawings, FIG. 1 is a simplified block diagram of a telecommunications system 10 in which an exemplary embodiment of the invention can be implemented. It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

As shown, the system 10 includes at its core a first access network $14_a$ and a second access network $14_b$. The first access network $14_a$ serves wireless communication devices (WCDs) 12 operating in a first coverage area $C_a$, which is defined by the first access network's one or more antenna structures $16_a$. Within the first coverage area $C_a$, the antenna structures $16_a$ may transmit RF radiation patterns that provide one or more air interfaces $18_a$ through which the WCDs 12 may communicate with the first access network $14_a$. Similarly, the second access network $14_b$ serves WCDs 12 operating in a second coverage area $C_b$, which is defined by the second access network's one or more antenna structures $16_b$. Within the second coverage area $C_b$, the antenna structures $16_b$ may transmit RF radiation patterns that provide one or more air interfaces $18_b$ through which the WCDs 12 may communicate with the second access network $14_b$. Within this general configuration, each of the access networks $14_a$ and $14_b$ may provide the WCDs 12 with access to various network resources, including a circuit-switched network 20 (e.g., the public-switched telephone network (PSTN) and/or a signaling network) and/or a packet-switched network 22 (e.g., the Internet)

Preferably, as shown, the first access network $14_a$ and the second access network $14_b$ will be overlaid upon one another, such that the first coverage area $C_a$ and the second coverage area $C_b$ substantially overlap. In this respect, the first access network $14_a$ and the second access network $14_b$ may each have respective antenna structures $16_a$ and $16_b$ defining the overlapping coverage area, and may also share one or more of the antenna structures $16_{a/b}$.

Additionally, the first coverage area $C_a$ and the second coverage area $C_b$ will preferably each contain a plurality of smaller coverage areas, or "sub-coverage" areas (e.g., cells and/or sectors). In this respect, the layout of the sub-coverage areas within each of the coverage areas $C_a$ and $C_b$ will depend on the implementation (e.g., location, antenna orientation, air-interface protocol, etc.) of the given access network's respective antenna structures 16. As such, the sub-coverage areas $S_a$ of the first coverage area $C_a$ and the sub-coverage areas $S_b$ of the second coverage area $C_b$ may be independent of one another, and may thus have different parameters. For example, the sub-coverage areas $S_a$ of the first coverage area $C_a$ and the sub-coverage areas $S_b$ of the second coverage area $C_b$ may have different locations, shapes, sizes, and/or orientations. In turn, the first coverage area $C_a$ and the second coverage area $C_b$ may also contain a different quantity of sub-coverage areas.

The air interfaces for each access network $14_a$ and $14_b$ may carry communications according to any of a variety of protocols, including CDMA (e.g., 1xRTT, IS-856), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and other protocols now known or later developed. In this respect, the overlaid access networks $14_a$ and $14_b$ will preferably employ different air-interface protocols. For example, the first access network $14_a$ may employ a third generation (3G) protocol such as CDMA (e.g., 1xRTT, IS-856), UMTS, or EDGE, and the second access network $14_b$ may employ a fourth generation (4G) protocol such as WiMAX (e.g., IEEE 802.16), WiBro, or LTE. Many other examples are possible as well.

The WCDs 12 may be dual-mode devices that are capable of communicating according to at least two air-interface protocols. For example, a dual-mode WCD 12 may be capable of communicating according to both a CDMA protocol and a WiMAX protocol. Many other examples are possible as well. In turn, the dual-mode WCDs 12 may be capable of being provisioned, registering, and potentially operating, in both the first access network $14_a$ and the second access network $14_b$. In this respect, a dual-mode WCD 12 may be able to receive service from both the first access network $14_a$ and the second access network $14_b$.

Figure 2:
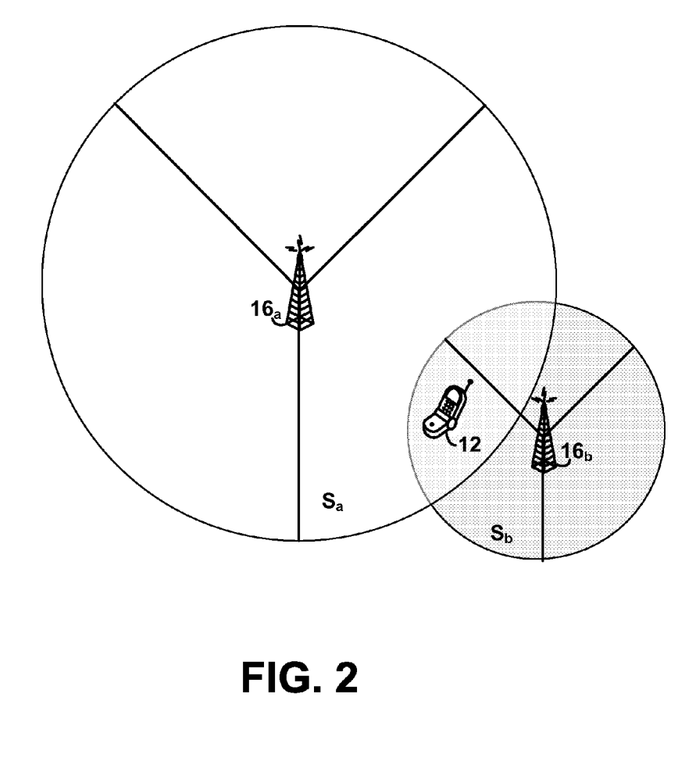
FIG. 2 illustrates a given WCD located in overlapping sub-coverage areas of the first access network and the second access network of the system of FIG. 1, according to an example of the present invention.

Within this arrangement, at any given time, a dual-mode WCD 12 may be located in both the first coverage area $C_a$ and the second coverage area $C_b$. More particularly, a WCD 12 may be located in both a sub-coverage area $S_a$ of the first access network $14_a$ and a sub-coverage area $S_b$ of the second access network $14_b$, where the first access network's sub-coverage area $S_a$ and the second access network's coverage area $S_b$ at least partially overlap. FIG. 2 illustrates a given WCD 12 located in overlapping sub-coverage areas of the first access network $14_a$ and the second access network $14_b$, according to an example of the present invention. While located in these overlapping sub-coverage areas, a dual-mode WCD 12 provisioned to operate both the first access network $14_a$ and the second access network $14_b$ can then receive service in both the first access network's sub-coverage area $S_a$ and the second access network's sub-coverage area $S_b$.

Figure 3:
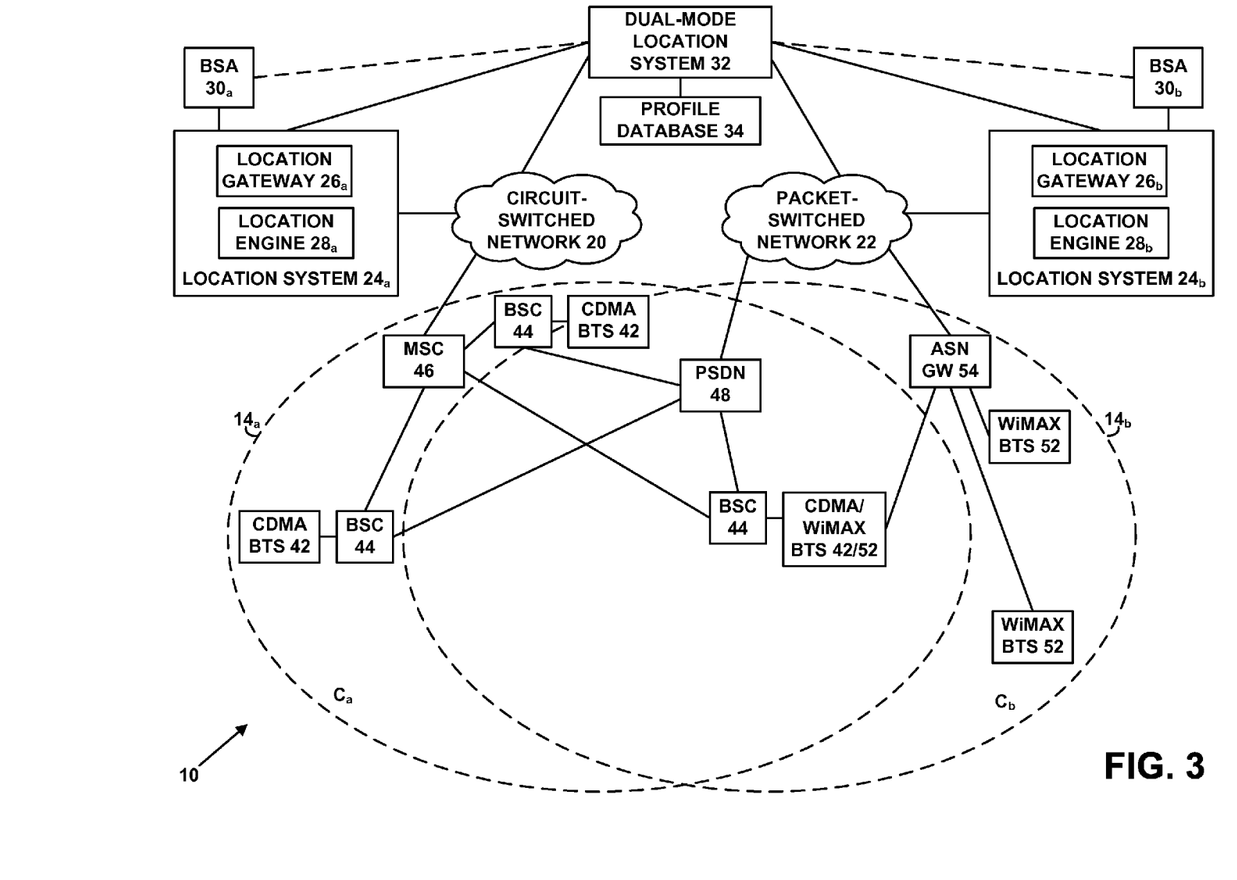
FIG. 3 is a simplified diagram of the system of FIG. 1 with an exemplary first access network and an exemplary second access network.

FIG. 3 is a simplified diagram of the system 10 with an exemplary first access network $14_a$ and an exemplary second access network $14_b$. The exemplary first access network $14_a$ may facilitate air interface communications according to a CDMA protocol, and the exemplary second access network $14_b$ may facilitate air interface communications according to a WiMAX protocol. For purposes of illustration, some of the elements depicted in FIG. 1 are not shown.

As shown, the CDMA network $14_a$ may include, among other entities, a plurality of CDMA base transceiver stations (BTSs) 42, a plurality of base station controllers (BSCs) 44, a mobile switching center (MSC) 46, and a packet data serving node (PDSN) 48. Each CDMA BTS 42 may include, among other components, at least one of the above-described antenna structures $16_a$. As such, each CDMA BTS 42 may provide one or more air interfaces $18_a$ for communication with the WCDs 12 according to a CDMA protocol. Further, the CDMA BTSs 42 may define the coverage area $C_a$ and sub-coverage areas $S_a$ of the CDMA network $14_a$. In one example, each CDMA BTS 42 may define a single cell that contains 3 sectors, each of which has a radius of approximately 2 miles and a beam width of 120 degrees. Other examples are possible as well.

Each CDMA BTS 42 may then couple to a corresponding BSC 44, which may function to communicate with the CDMA BTS 42 and control aspects of the CDMA BTS 42 as well as aspects of the air interface communication with the WCDs 12. Each CDMA BTS 42 and its corresponding BSC 44 may be referred to as a "Base Station." (Although FIG. 2 depicts each BTS 42 coupling to a different BSC 44, it should be understood that multiple BTSs 42 may couple to a single BSC 44). Each BSC 44 may then communicatively couple to one or more transport networks. For example, as shown, each BSC 44 may couple to (or be integrated with) the MSC 46, which may provide connectivity with a circuit-switched network 20 (e.g., PSTN or an SS7 network). As another example, each BSC 44 may couple to (or be integrated with) the PDSN 48, which may provide connectivity with the packet-switched network 22 (e.g., the Internet). Other examples are possible as well.

The WiMAX network $14_b$ may include, among other entities, a plurality of WiMAX BTSs 52 and an ASN gateway 54. Each WiMAX BTS 52 may include, among other components, at least one of the above-described antenna structures $16_b$. As such, each WiMAX BTS 52 may provide one or more air interfaces $18_b$ for communication with the WCDs 12 according to a WiMAX protocol. Further, the WiMAX BTSs 52 may define the coverage area $C_b$ and sub-coverage areas $S_b$ of the WiMAX network $14_b$. In one example, each WiMAX BTS 52 may define a single cell that contains 3 sectors, each of which has a radius of approximately 1 mile and a beam width of approximately 120 degrees. In this respect, because the WiMAX sub-coverage areas $S_b$ are typically smaller than the CDMA sub-coverage areas $S_a$, the WiMAX network $14_b$ may require more BTSs than the CDMA network $14_a$ to provide service in the same market area. Other examples are possible as well.

Each WiMAX BTS 52 may then couple to the ASN gateway 54, which may function to communicate with the WiMAX BTS 52 and control aspects of the WiMAX BTS 52 as well as aspects of the air interface communication with the WCDs 12. In turn, the ASN gateway 54 may provide connectivity with the packet-switched network 22 (e.g., the Internet).

Referring back to FIG. 1, the system 10 may also include a location system 24 for each of the access networks $14_a$ and $14_b$. More particularly, the system 10 may include (a) a first location system $24_a$ for determining a WCD's location within the first access network's coverage area $C_a$ and (b) a second-location determination system $16_b$ for determining a WCD's location within the second access network's coverage area $C_b$. (It should be understood that the location systems $24_a$ and $24_b$ may each support multiple access networks. For example, the first location system $24_a$ may support all access networks employing a CDMA protocol, and the second location system $24_a$ may support all access networks employing a WiMAX protocol).

Each of the location systems $24_a$ and $24_b$ may be coupled to its respective access network(s) via one or more networks. For example, as shown, the first location system $24_a$ may be coupled to first access network $14_a$ via the circuit-switched network 20 (e.g., an SS7 network), and the second location system $24_b$ may be coupled to the second access network $14_b$ via the packet-switched network 22. In turn, each of the location systems $24_a$ and $24_b$ may communicate with WCDs 12 operating in its respective access network(s) via either "control plane" signaling or "user plane" signaling, concepts which are well known in the art.

The location systems $24_a$ and $24_b$ may take a variety of forms. In one example, as shown, the first location system $24_a$ and the second location system $24_b$ may be separate entities. Alternatively, the first location system $24_a$ and the second location system $24_b$ may be incorporated into a single entity. In another example, as shown, each of the location systems $24_a$ and $24_b$ may include a location gateway 26 (e.g., a mobile positioning center (MPC) or gateway mobile location center (GMLC)) and a location engine 28 (e.g., a position determining entity (PDE) or serving mobile location center (SMLC)). In still another example, each of the location systems $24_a$ and $24_b$ may include a front-end location server (not shown). Other examples are possible as well.

Each of the location systems $24_a$ and $24_b$ may also include or have access to a database 30, known as a base station almanac (BSA), which maintains data regarding the entities and/or coverage areas of the access network(s) that the location system supports. For example, a given location system's BSA 30 may maintain, for each access network that the given location system supports, data indicating (a) one or more identifiers of each antenna structure 16 (e.g., Network ID, System ID, Base Station ID, etc.) and corresponding sub-coverage areas (e.g., carrier frequency, PN offset, etc.) within the given access network, (b) a location of each antenna structure 16 (e.g., geographic location) and corresponding sub-coverage areas (e.g., centroid location, radius, antenna azimuth, beam width, etc.), and/or (c) one or more operating parameters of each antenna structure 16 (e.g., air-interface protocol(s)). (It should be understood that a sub-coverage area's centroid location may be considered both an indication of the sub-coverage area's location and the sub-coverage area itself). Other examples are possible as well. Each of the location systems $24_a$ and $24_b$ may then use its respective BSA during the location-determination process.

In practice, a given location system (e.g., the first location system $24_a$ or the second location system $24_b$) may initiate a location process after receiving a location request for a given WCD 12. For example, the given location system may receive a location request from an emergency system entity (e.g., a public safety answering point (PSAP)). As another example, the given location system may receive a location request from a commercial location-based service (LBS) application server. As yet another example, the given location system may receive a location request from one of the WCDs, such as the given WCD 12. Other examples are possible as well.

In one aspect, the given location system may receive a location request seeking a low precision indication of the given WCD's location, such as a location of a coverage area in which the given WCD 12 is currently located (e.g., the geographic location of a cell/sector centroid). In response, the given location system may determine a low precision indication of the given WCD's location.

After receiving the location request seeking a low precision indication of the given WCD's location, the given location system may first determine the access network in which the given WCD 12 is located. In this respect, the given location system may query a database (e.g., home location register (HLR) or authentication, authorization, and accounting (AAA) server) to identify a node (e.g., MSC or ASN gateway) that is currently serving, or has most recently served, the given WCD 12. For example, the given location system may send to an HLR an IS-41 "Location Request" (LOCREQ) or IS-637 "SMS Request" (SMSREQ) message that includes an identifier of the given WCD 12, and as a result receive from the HLR an identifier of the node that is currently serving, or has most recently served, the given WCD 12 (e.g., in a LOCREQ return result (locreq_rr) or SMSREQ return result (smsreq_rr) message). Other examples are possible as well. This serving node will be part of a given access network (e.g., the first access network $14_a$ or the second access network 140.

The given location system may then send to the serving node a low precision location request seeking an identifier of a sub-coverage area of the given access network in which the given WCD 12 is located. For example, the given location system may send an IS-881 Inter-System Position Request (ISPOSREQ)) to an MSC, or a similar message to an ASN gateway. In turn, the serving node may receive the low precision location request from the given location system, and the serving node may then work with other entities of the given access network to determine the sub-coverage area in which the given WCD 12 is located.

In one example, an entity of the given access network (e.g., an MSC or ASN gateway) may already be maintaining data identifying the sub-coverage area in which the given WCD 12 is located (e.g., if the given access network has a traffic channel in a given sector assigned to the given WCD 12), in which case the given access network may determine the sub-coverage area by simply accessing that data. In another example, the given access network may need to contact the given WCD 12 to determine the sub-coverage area in which the given WCD 12 is located. For instance, the given access network may page the given WCD 12 in one or more of the given access network's sub-coverage areas. In turn, a given base station of the given access network may receive a page response from the given WCD 12 (e.g., via an access channel). Based on the identity of the base station and/or the particular channel on which the given access network receives the page response, the given access network may then determine the sub-coverage area in which the given WCD 12 is located. Other examples for determining the sub-coverage area in which the given WCD 12 is located within the given access network may exist as well.

After determining the sub-coverage area in which the given WCD 12 is located, the serving node may send to the given location system an identifier of that sub-coverage area. For example, an MSC may send the given location system an IS-881 ISPOSREQ return result (isposreq_rr) message, or an ASN gateway may send the given location system a similar message. In turn, the given location system may use the identifier of the sub-coverage area in which the given WCD 12 is located to determine an indication of the sub-coverage area's location, such as by querying a BSA to obtain a centroid location of the sub-coverage area. The indication of the sub-coverage area's location may then be returned as the low precision indication of the WCD's location. In this respect, the accuracy of the low precision indication of the WCD's location may depend on the size of the sub-coverage areas defined by the given access network.

In another aspect, the given location system may receive a location request seeking a high precision indication of the given WCD's location, such as an indication of the geographic position of the given WCD 12 itself (rather than its sector's centroid location). In response, the given location system may determine a high precision indication of the given WCD's location.

More particularly, the given location system may first obtain an indication of the sub-coverage area in which the given WCD 12 is located, such as by using the methods described above. The given location system may then use that indication of the sub-coverage area in which the given WCD 12 is located to identify (e.g., look up) which satellite(s) the WCD 12 should use to obtain satellite-based positioning information. Thereafter, the given location system may request that the given WCD 12 obtain satellite-based positioning data from the identified satellite(s). For example, the given location system may send an IS-881 SMDPP message to an MSC, which may in turn send an IS-801 PD Request message to the given WCD 12. After receiving the request, the given WCD 12 may obtain satellite-based positioning data from the identified satellite(s) and then return that satellite-based positioning data to the given location system. For example, the given WCD 12 may send an IS-801 PD Response message to an MSC, which may in turn send an IS-881 smdpp_rr message to the given location system. Many other examples are possible as well.

After receiving the satellite-based positioning data, the given location system may attempt to determine a high precision indication of the WCD's location using a variety of methods. For example, the given location system may use the well known "Assisted GPS" (AGPS) computation to calculate the WCD's location. As another example, the given location system may use a hybrid satellite-network fix computation (e.g., based on some satellite-based positioning information and some BSA data) to calculate the given WCD's location. As yet another example, the given location system may use a mixed cell advanced forward link trilateration (AFLT) computation (e.g., based on BSA data for at least three BTSs in communication with the given WCD 12) to calculate the given WCD's location. Other examples may exist as well. If the above methods for determining a high precision indication of the given WCD's location fail, however, the given location system may return an indication of the identified sub-coverage area's location as the indication of the given WCD's location.

As can be seen, the ability to determine a low precision indication of the WCD's location (e.g., a centroid location of the sub-coverage area in which the WCD is located) is integral to location determination. In some cases, a low precision indication of the WCD's location may have sufficient precision for certain applications, in which case entities may request only a low precision indication of the WCD's location in the first instance. In other cases, the low precision indication of the WCD's location may be used as a basis to determine a high precision indication of the WCD's location, either in identifying the satellites from which to obtain more precise location data and/or as a fall back option when attempts to determine a high precision indication of the WCD's location fail. Thus, it would be desirable to improve the accuracy of the low precision indication of the WCD's location without sacrificing the simplicity and efficiency of the method for determining that low precision indication of the WCD's location.

To facilitate this, the system 10 may additionally include a dual-mode location system 32. As shown, the dual-mode location system 32 may be communicatively coupled to (and/or integrated with) the first location system $24_a$ and the second location system $24_b$. Additionally, the dual-mode location system 32 may be coupled to the circuit-switched network 20 and/or the packet-switched network 22. The dual-mode location system 32 may then function to (a) handle location requests from requesting entities (e.g., an LBS application server, an emergency service entity, WCDs 12, etc.) to the location systems 24 and (b) determine a more accurate low precision indication of a dual-mode WCD's location based on location data obtained from both the first location system $24_a$ and the second location system $24_b$, as described in more detail below.

The dual-mode location system 32 may take a variety of forms. In one example, as shown, the dual-mode location system 32 may be a separate entity from the location systems $24_a$ and $24_b$. Alternatively, the dual-mode location system 32 may be incorporated into the first location system $24_a$, the second location system $24_b$, and/or some other entity of the system 10. As another example, the dual-mode location system 32 may include (a) location middleware for handling incoming location requests to the location systems 24 and (b) a dual-mode location module for determining a low precision indication of a dual-mode WCD's location. Other examples are possible as well.

The dual-mode location system 32 may also include and/or have access to a profile database 34 that maintains data for WCDs capable of operating in the first access network $14_a$ and/or the second access network $14_b$. The profile database 34 may include, for each WCD 12, one or more identifiers of (a) the WCD (e.g., Mobile Station Identifier (MSID), Media Access Control Identifier (MAC ID), etc.), (b) a user of the WCD (e.g., a subscriber name), (c) each air-interface protocol over which the WCD is capable of communicating, and (d) each access network in which the WCD is provisioned to operate and/or registered. The device profile database may include other data as well.

Figure 4:
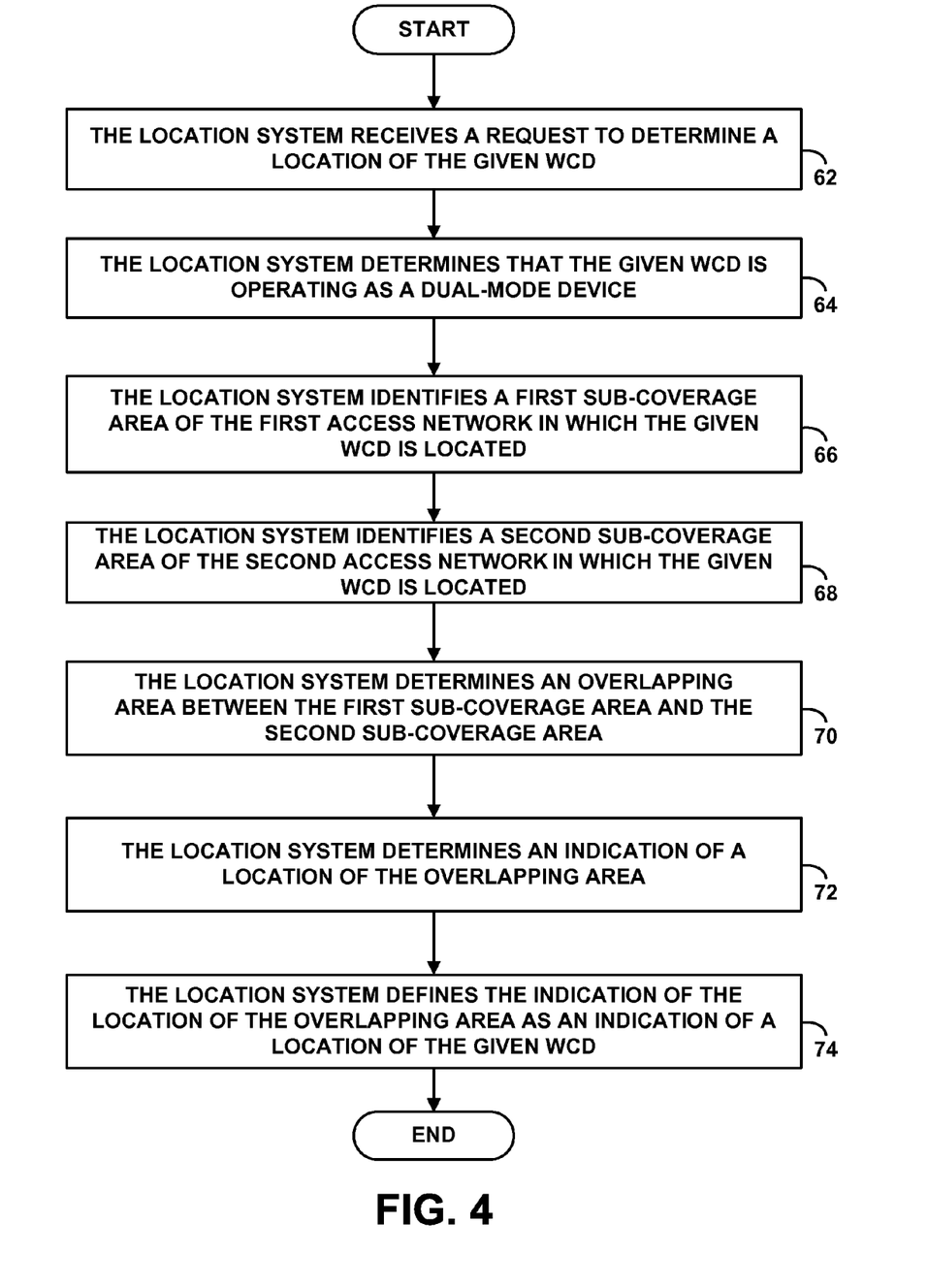
FIG. 4 is a flow chart depicting a method of determining a location of a given WCD, according to an example of the present invention.

FIG. 4 is a flow chart depicting a method of determining a location of a given WCD 12 that is provisioned to operate in both the first access network $14_a$ and the second access network $14_b$, according to an example of the present invention. In a preferred example, the method described herein will be carried out by an improved location system that may include the dual-mode location system 32 working together with the first location system $24_a$ and the second location system $24_b$.

At step 62, the location system may receive a first request to determine a location of the given WCD 12 (e.g., from a requesting entity). In one example, the first request may seek a low precision indication of the given WCD's location. In another example, the first request may seek a high precision indication of the given WCD's location.

At step 64, the method may include determining that the given WCD 12 is operating as a dual-mode device. For example, the dual-mode location system 32 may obtain data for the given WCD 12 from the profile database 34 and, based on that data, determine that the given WCD 12 is provisioned to operate and/or registered in both the first access network $14_a$ and the second access network $14_b$. Other examples are possible as well.

At step 66, conditioned on a determination that the WCD 12 is operating as a dual-mode device, the location system may identify a first sub-coverage area $S_a$ of the first access network $14_a$ in which the given WCD 12 is located. For example, the location system may communicate with the first access network $14_a$ to obtain an indication of the first sub-coverage area $S_a$. In this respect, if the first request is a request seeking a low precision indication of the WCD's location, the location system may (a) send a low precision request to the first access network $14_a$ and, as a result, (b) receive from the first access network $14_a$ an identifier of the first sub-coverage area $S_a$. Alternatively, if the first request is a request seeking a high precision indication of the WCD's location, the location system may (a) receive from the first access network $14_a$ an identifier of the first sub-coverage area $S_a$ while attempting to determine a high precision indication of the given WCD's location and then (b) fail to determine the high precision indication of the given WCD's location.

At step 68, the location system may identify a second sub-coverage area $S_b$ of the second access network $14_b$ in which the given WCD 12 is located. For example, the location system may communicate with the second access network $14_b$ to obtain an identifier of the second sub-coverage area $S_b$. In this respect, the location system may (a) send a low precision request to the second access network $14_b$ and, as a result, (b) receive from the second access network $14_b$ an identifier of the second sub-coverage area $S_b$.

At step 70, the location system may determine an overlapping area between the first sub-coverage area $S_a$ and the second sub-coverage area $S_b$. For example, the location system may (a) use the received identifier of the first sub-coverage area $S_a$ to obtain parameters for the first sub-coverage area $S_a$, (b) use the received identifier of the second sub-coverage area $S_b$ to obtain parameters for the second sub-coverage area $S_b$, and (c) calculate the overlapping area between those sub-coverage areas based on the parameters for the first sub-coverage area $S_a$ and the second sub-coverage area $S_b$. In this respect, the location system may use the received identifiers to obtain data for the sub-coverage areas from the BSAs $30_a$ and $30_b$. The parameters for the sub-coverage areas may include centroid location, radius, antenna azimuth, and/or beam width for instance.

At step 72, the location system may determine an indication of a location of the overlapping area. For example, the location system may calculate a centroid location of the overlapping area as the indication of the overlapping area's location. In turn, at step 74, the location system may define the indication of the location of the overlapping area as an indication of the given WCD's location. The location system may then send the indication of the given WCD's location to the requesting entity.

Advantageously, the location method described herein may provide a more accurate estimation of a dual-mode WCD's location. More particularly, because the overlapping area between the first sub-coverage area $S_a$ and the second sub-coverage area $S_b$ will likely be smaller than either the first or second sub-coverage area, the location system can narrow down the area in which the given WCD 12 is located. In turn, this narrowed area allows the location system to provide a more accurate estimation of the given WCD's location.

Figure 5:
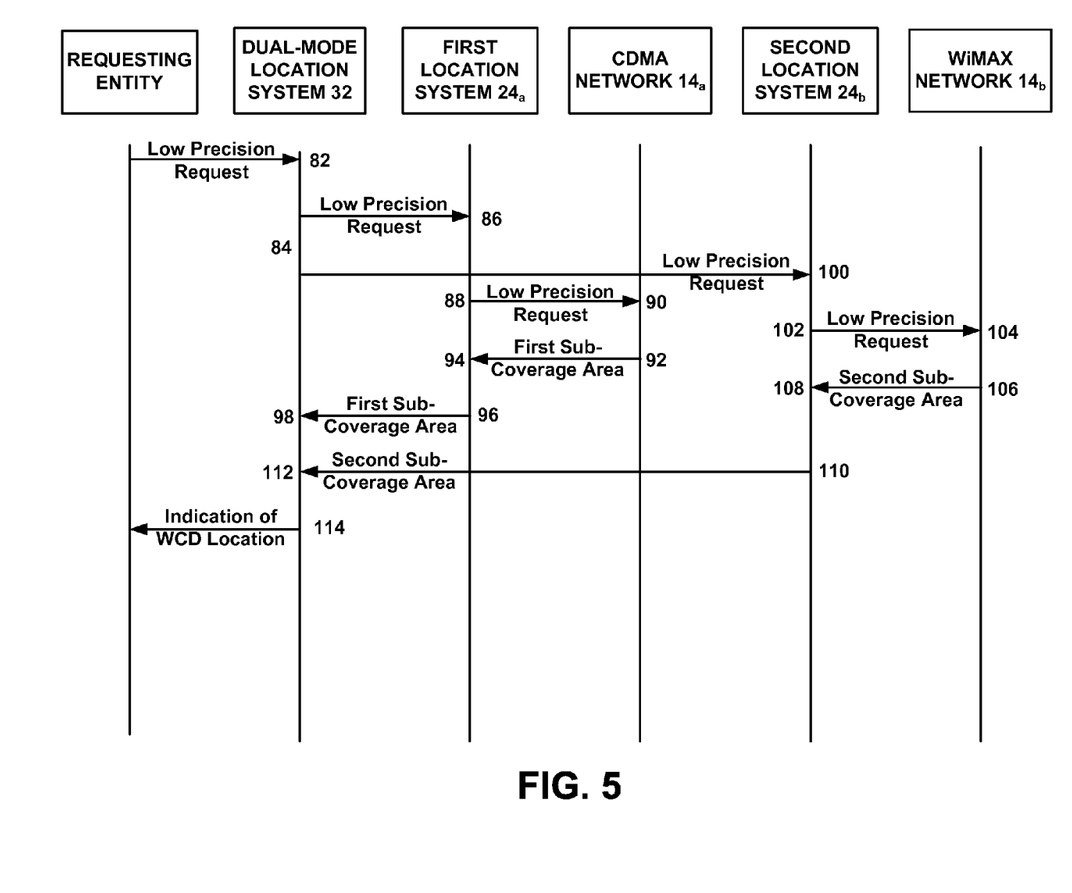
FIG. 5 is a simplified message flow diagram that illustrates a first exemplary communication for determining a location of a given WCD.

FIG. 5 is a simplified message flow diagram that illustrates in more detail an exemplary method for determining a location of a given WCD 12 provisioned to operate in both the first access network $14_a$ and the second access network $14_b$. For purposes of illustration, the following description will assume that the first access network $14_a$ is the exemplary CDMA network described above, and the second access network $14_b$ is the exemplary WiMAX network described above. It should be understood, however, that the first access network $14_a$ and the second access network $14_b$ may alternatively employ other air-interface protocols.

The sequence may begin at step 82 when the dual-mode location system 32 receives from a requesting entity a location request seeking a low precision indication of the given WCD's location. In one example, the dual-mode location system 32 may receive the location request from a network entity, such as an LBS application server or an emergency service entity (e.g., a PSAP). In another example, the dual-mode location system 32 may receive the location request from one of the WCDs, such as the given WCD 12 or another WCD. Other examples are possible as well.

After receiving the location request seeking the low precision indication of the given WCD's location, the dual-mode location system 32 may first determine whether the given WCD 12 is operating as a dual-mode device. In this respect, the dual-mode location system 32 may obtain data for the given WCD 12 from the profile database 34, which may indicate whether the given WCD 12 is operating as a dual-mode device. For example, the profile database 34 may include data indicating whether the given WCD 12 is capable of communicating over a single air-interface protocol or multiple air-interface protocols. As another example, the device profile database 34 may include data indicating whether the given WCD 12 is provisioned to operate and/or registered in a single access network or multiple access networks of the system 10. Other examples are possible as well.

If the dual-mode location system 32 determines that the given WCD 12 is operating as a single-mode device (e.g., the given WCD 12 is only capable communicating over a single air-interface protocol or is only provisioned to operate and/or registered in a single access network), the dual-mode location system 32 may initiate a typical single-mode location method. More particularly, the dual-mode location system 32 may pass the received location request on to the location system 24 supporting the access network 14 in which the given WCD 12 is capable of operating (e.g., the first location system $24_a$ if the given WCD 12 is operating in the CDMA network $14_a$). In turn, that location system 24 may handle the location request as described above.

Alternatively, if the dual-mode location system 32 determines that the given WCD 12 is operating as a dual-mode device (e.g., the given WCD 12 is capable of communicating over two air-interface protocols and is provisioned to operate and/or registered in two access networks), the dual-mode location system 32 may initiate a dual-mode location method. More particularly, at step 84, the dual-mode location system 32 may (a) send to the first location system $24_a$ a request seeking an indication of a sub-coverage area $S_a$ of the CDMA network $14_a$ in which the given WCD 12 is currently located and (b) send to the second location system $24_a$ a request seeking an indication of a sub-coverage area $S_b$ of the WiMAX network $14_b$ in which the given WCD 12 is currently located. In one example, the requests may take the form of Mobile Location Protocol (MLP) or Open Location Services (OpenLS) messages. As shown, the dual-mode location system 32 may send the requests to the first and second location systems $24_a$ and $24_b$ substantially simultaneously. Alternatively, the dual-mode location system 32 may initially send a request to only one of the location systems 24, and may then send a request to the other location system at a later time (e.g., after receiving a result from the first location system).

At step 86, the first location system $24_a$ may receive the request from the dual-mode location system 32. In turn, the first location system $24_a$ may function to determine an indication of the sub-coverage area $S_a$ of the CDMA network $14_a$ in which the given WCD 12 is currently located according to any method now known or later developed, such as the method described above.

For example, at step 88, the first location system $24_a$ may send to the MSC 44 a low precision location request seeking an identifier of the CDMA network's sub-coverage area $S_a$ in which the given WCD 12 is located. At step 90, the MSC 44 may receive the low precision location request from the first location system $24_a$. In response, at step 92, the MSC 44 may determine the sub-coverage area $S_a$ in which the given WCD 12 is located and then send an identifier of that sub-coverage area $S_a$ to the first location system $24_a$. At step 94, the first location system $24_a$ may receive from the CDMA network $14_a$ the identifier of the sub-coverage area $S_a$ in which the given WCD 12 is located.

At step 96, after receiving the identifier of the CDMA network's sub-coverage area $S_a$, the first location system $24_a$ may send an indication of that sub-coverage area $S_a$ to the dual-mode location system 32 (e.g., in an MLP or OpenLS message). In one example, the first location system $24_a$ may responsively send the received identifier of the CDMA network's sub-coverage area $S_a$ to the dual-mode location system 32. As another example, the first location system $24_a$ may use the received identifier of the CDMA network's sub-coverage area $S_a$ to determine a centroid location of the sub-coverage area $S_a$, such as by querying the BSA $30_a$, in which case the first location system $24_a$ may then send the centroid location to the dual-mode location system 32. In either case, at step 98, the dual-mode location system 32 may receive the indication of the CDMA network's sub-coverage area $S_a$ in which the given WCD 12 is located.

Similarly, at step 100, the second location system $24_b$ may receive the request from the dual-mode location system 32. In turn, the second location system $24_b$ may function to determine an indication of the sub-coverage area $S_b$ of the WiMAX network $14_b$ in which the given WCD 12 is currently located according to any method now known or later developed, such as the method described above.

For example, at step 102, the second location system $24_b$ may send to the ASN gateway 54 a low precision location request seeking an identifier of the WiMAX network's sub-coverage area $S_b$ in which the given WCD 12 is located. At step 104, the ASN gateway 54 may receive the low precision location request from the second location system $24_b$. In response, at step 106, the ASN gateway may determine the sub-coverage area $S_b$ in which the given WCD 12 is located and then send an identifier of that sub-coverage area $S_b$ to the second location system $24_b$. At step 108, the second location system $24_b$ may receive from the WiMAX network $14_b$ the identifier of the sub-coverage area $S_b$ in which the given WCD 12 is located.

At step 110, after receiving the identifier of the WiMAX network's sub-coverage area $S_b$, the second location system $24_b$ may send an indication of the WiMAX network's sub-coverage area $S_b$ to the dual-mode location system 32. In one example, the second location system $24_b$ may responsively send the received identifier of the WiMAX network's sub-coverage area $S_b$ to the dual-mode location system 32. As another example, the second location system $24_b$ may use the identifier of the WiMAX network's sub-coverage area $S_b$ to determine a centroid location of the sub-coverage area $S_b$, such as by accessing the BSA $30_b$, in which case the second location system $24_b$ may send the centroid location to the dual-mode location system 32. In either case, at step 112, the dual-mode location system 32 may then receive the indication of the WiMAX network's sub-coverage area Sb in which the given WCD 12 is located.

Thereafter, the dual-mode location system 32 may determine an overlapping area of the CDMA network's sub-coverage area $S_a$ and the WiMAX network's sub-coverage area $S_b$. More particularly, the dual-mode location system 32 may use the indication of the CDMA network's sub-coverage area $S_a$ received at step 98 to obtain parameters of that sub-coverage area $S_a$ (e.g., base station location, centroid location, radius, antenna azimuth, beam width, etc.), such as by accessing the first location system's BSA $30_a$. Similarly, the dual-mode location system 32 may use the indication of the WiMAX network's sub-coverage area $S_b$ received at step 112 to obtain parameters of that sub-coverage area $S_b$ (e.g., base station location, centroid location, radius, antenna azimuth, beam width, etc.), such as by accessing the second location system's BSA $30_b$. In this respect, the dual-mode location system 32 may communicate with the BSAs either directly or via one or more entities of the location systems $24_a$ and $24_b$.

The dual-mode location system 32 may then use the parameters for the CDMA network's sub-coverage area $S_a$ and the WiMAX network's sub-coverage area $S_b$ to calculate an overlapping area between those serving sectors $S_a$ and $S_b$. For example, based on the parameters for the CDMA network's sub-coverage area $S_a$, the dual-mode location system 32 may determine the geographic boundaries of the CDMA network's sub-coverage area $S_a$, such as by modeling the boundaries using a first algebraic equation (e.g., $y=f_1(x)$). Similarly, based on the parameters for the WiMAX network's sub-coverage area $S_b$, the dual-mode location system 32 may determine the geographic boundaries of the WiMAX network's sub-coverage area $S_b$, such as by modeling the boundaries using a second algebraic equation (e.g., $y=f_2(x)$).

Once the dual-mode location system 32 has determined the geographic boundaries of the CDMA network's sub-coverage area $S_a$ and the WiMAX network's sub-coverage area $S_b$, the dual-mode location system 32 may calculate the geographic boundaries of the overlapping area between the sub-coverage areas using various algorithms. For example, after modeling the geographic boundaries of the sub-coverage areas, the dual-mode location system 32 may determine intersecting points between the two sub-coverage areas, such as by solving the first and second algebraic equations. The dual-mode location system 32 may then model the overlapping area by using the first algebraic equation (e.g., $y=f_1(x)$) on one side of the intersecting points and the second algebraic equation (e.g., $y=f_2(x)$) on the other side of the intersection points.

Once the overlapping area has been calculated, the dual-mode location system 32 may then determine an indication of the overlapping area's location. Preferably, the dual-mode location system 32 will calculate a centroid location of the overlapping area as the indication of the overlapping area's location. For example, if the overlapping area is modeled using the first algebraic equation (e.g., $y=f_1(x)$) on one side and the second algebraic equation (e.g., $y=f_2(x)$) on the other side, the dual-mode location system 32 may calculate an x coordinate of the centroid location using the following equation:

$$x = \frac{\int_{x_1}^{x_2} x[f_1(x) - f_2(x)]\,dx}{\int_{x_1}^{x_2} [f_1(x) - f_2(x)]\,dx}$$

The dual-mode location system 32 may then calculate a y coordinate of the centroid location in a similar manner. Alternatively, the dual-mode location system 32 may select a different geographic location of the overlapping area as the indication of the overlapping area's location.

In one example, the dual-mode location system 32 may calculate the geographic boundaries and/or the indicated location of the overlapping area between a CDMA network's sub-coverage area and a WiMAX network's sub-coverage area each time the dual-mode location system 32 receives a location request for the given WCD 12. Due to the static nature of sub-coverage area locations and layouts, however, the dual-mode location system 32 may only need to calculate the geographic boundaries and/or the indicated location of the overlapping area between each pair of overlapping sub-coverage areas once. In this respect, the dual-mode location system 32 may store data indicating the calculated geographic boundaries and/or location of each possible overlapping area. Thereafter, when the dual-mode location system 32 determines that the given WCD 12 is located in both the CDMA network's sub-coverage area $S_a$ and the WiMAX network's sub-coverage area $S_b$, the dual-mode location system 32 may simply lookup the indicated location (e.g., centroid) of the overlapping area between the CDMA network's sub-coverage area $S_a$ and the WiMAX network's sub-coverage area $S_b$.

After determining the indication of the overlapping area's location, the dual-mode location system 32 may then define the indication of the overlapping area's location as an indication of the given WCD's location. At step 114, the dual-mode location system 32 may then send this low precision indication of the given WCD's location to the requesting entity.

Figure 6:
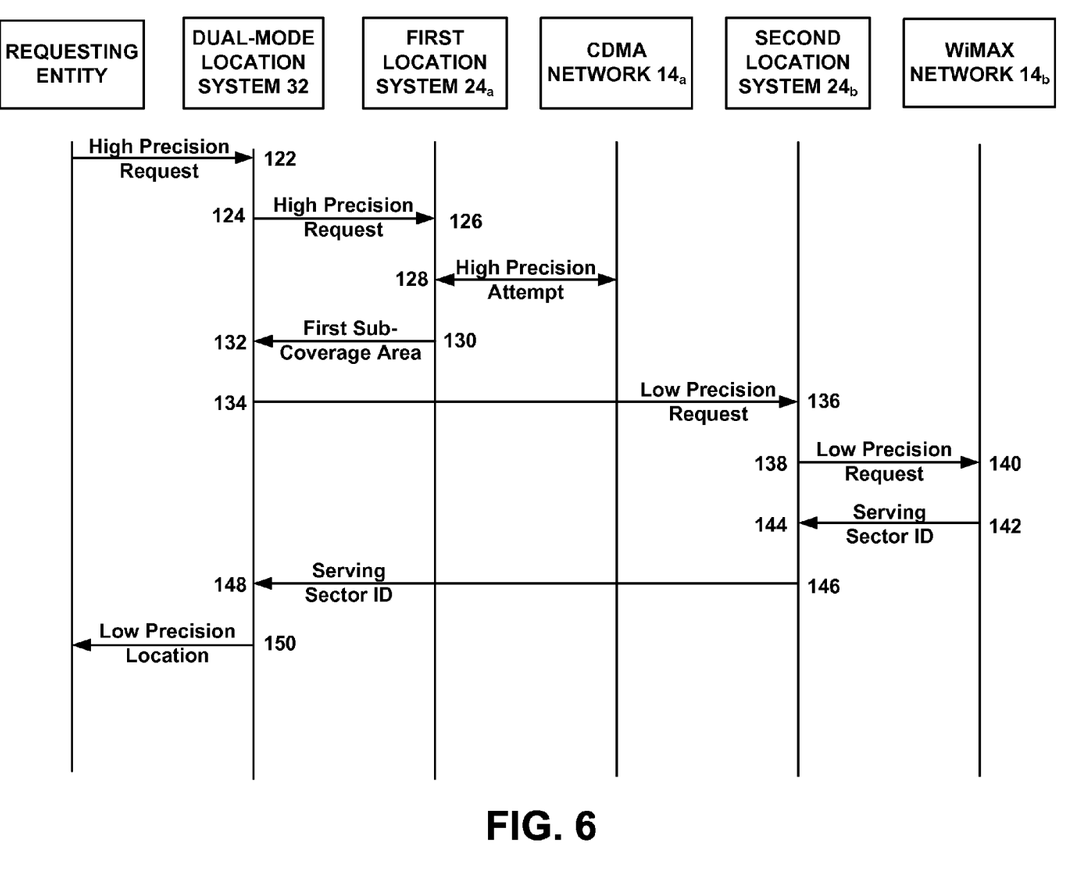
FIG. 6 is a simplified message flow diagram that illustrates a second exemplary communication for determining a location of a given WCD.

FIG. 6 is another simplified message flow diagram that illustrates in more detail an exemplary method for determining a location of a given WCD 12 provisioned to operate in both the first access network $14_a$ and the second access network $14_b$. For purposes of illustration, the following description will assume that the first access network $14_a$ is the exemplary CDMA network described above, and the second access network $14_b$ is the exemplary WiMAX network described above. It should be understood, however, that the first access network $14_a$ and the second access network $14_b$ may alternatively employ other air-interface protocols.

The sequence may begin at step 122 when the dual-mode location system 32 receives from a requesting entity a location request seeking a high precision indication of the given WCD's location. After receiving the location request seeking the high precision indication of the given WCD's location, the dual-mode location system 32 may first determine whether the given WCD 12 is operating as a dual-mode device, such as by obtaining from the profile database 34 data indicating whether the given WCD 12 is operating as a dual-mode device.

If the dual-mode location system 32 determines that the given WCD 12 is operating as a single-mode device, the dual-mode location system 32 may initiate a typical single-mode location method. More particularly, the dual-mode location system 32 may pass the received location request on to the location system 24 supporting the access network 14 in which the given WCD 14 is capable of operating (e.g., the first location system $24_a$ if the given WCD 12 is operating in the CDMA network $14_a$). In turn, that location system 24 may handle the location request as described above.

Alternatively, if the dual-mode location system 32 determines that the given WCD 12 is operating as a dual-mode device, the dual-mode location system 32 may initiate a dual-mode location method. More particularly, at step 124, the dual-mode location system 32 may send a location request (e.g., an MLP or OpenLS message) seeking a high precision indication of the given WCD's location to one of the location systems 24 (e.g., the first location system $24_a$ or the second location system $24_b$). In this respect, the dual-mode location system 32 may use various criteria in determining whether to first send the location request to the first location system $24_a$ or the second location system $24_b$. As one of many possible examples, the dual-mode location system 32 may select the location system based on the identity of the requesting entity. For purposes of illustration, the following description will assume that the dual-mode location system 32 sends the location request to the first location system 24$_a$.

At step 126, the first location system 24$_a$ may receive the location request from the dual-mode location system 32. In turn, the first location system 24$_a$ may attempt to determine a high precision indication of the WCD's location according to any method now known or later developed, such as one of the methods described above (e.g., AGPS, hybrid satellite-network fix, and/or AFLT).

For example, at step 128, the first location system 24$_a$ may communicate with the CDMA network 14$_a$ to determine a high precision indication of the given WCD's location. If the first location system's attempts to determine a high precision indication of the given WCD's location fail, however, the first location system 24$_a$ may return an indication of a location (e.g., a centroid location) of the sub-coverage area in which the given WCD 12 is located as the determined indication of the given WCD's location.

At step 130, the first location system 24$_a$ may send to the dual-mode location system 32 one or more indications of the given WCD's location, such as location coordinates and/or an estimated error. In turn, at step 132, the dual-mode location system 32 may receive the one or more indications and then determine whether the first location system 24$_a$ returned a high precision indication of the given WCD's location or a low precision indication of the given WCD's location. For example, the dual-mode location system 32 may use the one or more indications to perform a lookup in the first location system's BSA 30$_a$. In this respect, if the dual-mode location system 32 successfully looks up the one or more indications in the BSA 30$_a$, then the dual-mode location system 32 may determine that the first location system 24$_a$ returned a low precision indication; otherwise, the dual-mode location system 32 may determine that the first location system 24$_a$ returned a high precision indication. In another example, the one or more indications of the given WCD's location may include an indication of the method by which the first location system 24$_a$ determined the given WCD's location, which the dual-mode location system 32 may rely upon to determine whether the first location system 24$_a$ returned a high or low precision indication of the given WCD's location. Other examples are possible as well.

If the dual-mode location system 32 determines that the first location system 24$_a$ returned a high precision indication of the given WCD's location, the dual-mode location system 32 may send that high precision indication of the given WCD's location to the requesting entity and terminate the location-determination method. Alternatively, if the dual-mode location system 32 determines that the first location system 24$_a$ returned a low precision indication of the given WCD's location, and specifically an indication the CDMA network's sub-coverage area S$_a$ in which the given WCD 12 is located, the dual-mode location system 32 may request an indication of a sub-coverage area S$_b$ of the WiMAX network 14$_b$ in which the given WCD 12 is located.

More particularly, at step 134, the dual-mode location system 32 may send to the second location system 24$_b$ a request seeking an indication of the sub-coverage area S$_b$ of the WiMAX network 14$_b$ in which the given WCD 12 is located. (It should be understood that the dual-mode location system 32 may alternatively send the request to the second location system 24$_b$ before determining whether the first location system 24$_a$ returned a low precision indication of the given WCD's location).

At step 136, the second location system 24$_b$ may receive the request from the dual-mode location system 32. In turn, the second location system 24$_b$ may function to determine an indication of the sub-coverage area S$_b$ of the WiMAX network 14$_b$ in which the given WCD 12 is currently located according to any method now known or later developed, such as the method described above.

For example, at step 138, the second location system 24$_b$ may send to the ASN gateway 54 a low precision location request seeking an identifier the WiMAX network's sub-coverage area S$_b$ in which the given WCD 12 is located. At step 140, the ASN gateway 54 may receive the low precision location request from the second location system 24$_b$. In response, at step 142, the ASN gateway 54 may determine the sub-coverage area S$_b$ in which the given WCD 12 is located and then send an identifier of that sub-coverage area S$_b$ to the second location system 24$_b$. At step 144, the second location system 24$_b$ may receive from the WiMAX network 14$_b$ the identifier of the sub-coverage area S$_b$ in which the given WCD 12 is located.

At step 146, after receiving the identifier of the WiMAX network's sub-coverage area S$_b$, the second location system 24$_b$ may send an indication of the WiMAX network's sub-coverage area S$_b$ to the dual-mode location system 32. In one example, the second location system 24$_b$ may responsively send the received identifier of the WiMAX network's sub-coverage area S$_b$ to the dual-mode location system 32. As another example, the second location system 24$_b$ may use the identifier of the WiMAX network's sub-coverage area S$_b$ to determine a centroid location of the sub-coverage area S$_b$, such as by accessing the BSA 30$_b$, in which case the second location system 24$_b$ may send the centroid location to the dual-mode location system 32. In either case, at step 148, the dual-mode location system 32 may then receive the indication of the WiMAX network's sub-coverage area S$_b$ in which the given WCD 12 is located.

Thereafter, the dual-mode location system 32 may determine an overlapping area of the CDMA network's sub-coverage area S$_a$ and the WiMAX network's sub-coverage area S$_b$, as described above with reference to FIG. 5. In turn, the dual-mode location system 32 may determine an indication of the overlapping area's location. The dual-mode location system 32 may then define the indication of the overlapping area's location as an indication of the given WCD's location. At step 150, the dual-mode location system 32 may then send this low precision indication of the given WCD's location to the requesting entity.

Figure 7:
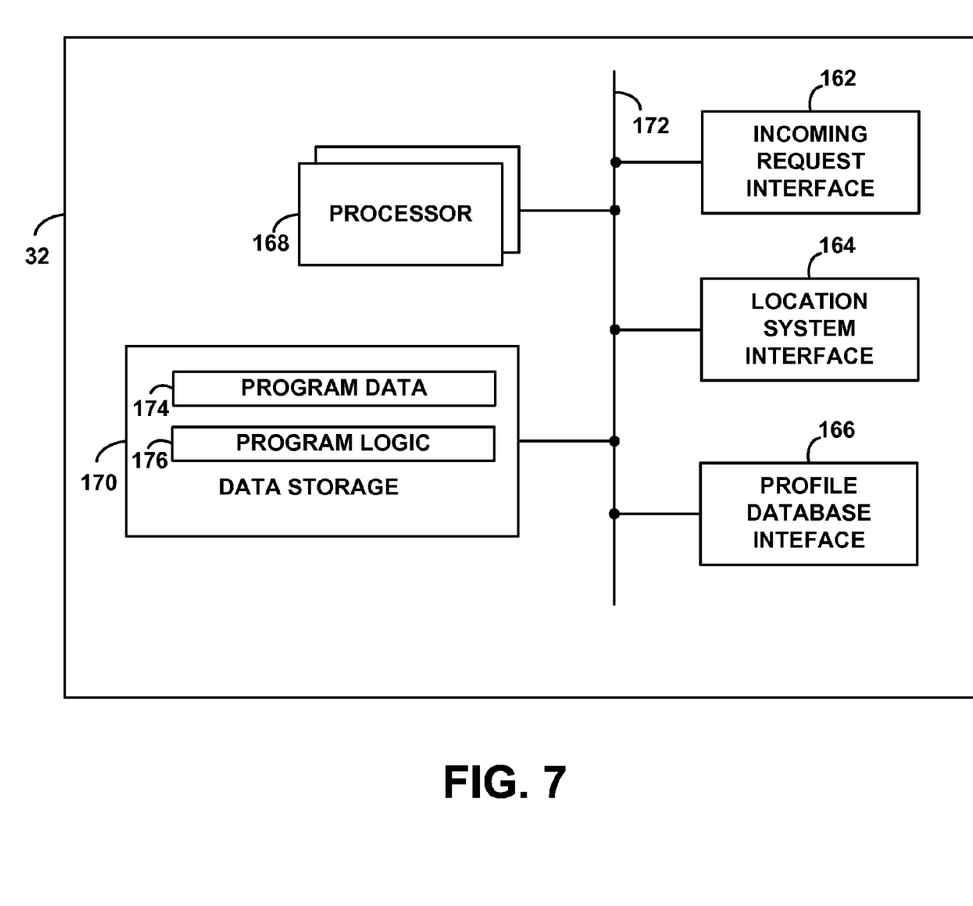
FIG. 7 is a simplified block diagram of the dual-mode location system of the system of FIG. 1, showing functional components that can operate to carry out aspects of the present invention.

FIG. 7 is a simplified block diagram of the dual-mode location system 32 of the system 10, showing functional components that can operate to carry out aspects of the present invention. As shown in FIG. 7, the dual-mode location system 32 may include, without limitation, an requesting entity interface 162, a location system interface 164, a profile database interface 166, a processor 168, and data storage 170, all interconnected by a system bus or other connection mechanism 172.

The requesting entity interface 162 preferably functions to receive and respond to incoming location requests from requesting entities. As such, the requesting entity interface 162 may be coupled to one or more networks (e.g., the packet-switched network 22), which may in turn couple the dual-mode location system 32 to various requesting entities (e.g., LBS application servers, emergency service entities, WCDs, etc.). The requesting entity interface 162 may take the form of an Ethernet network interface module, a chipset and antenna adapted to facilitate wireless communication according a desired protocol, and/or any other form that provides for wireless and/or wired communication. The requesting entity interface 162 may also include multiple requesting entity interfaces, such as one requesting entity interface for each different network to which the dual-mode location system 32 is coupled. Other configurations are also possible.

The location system interface 164 preferably functions to communicatively couple the dual-mode location system 32 to location entities of the system 10, such as the first location system $24_a$, the second location system $24_b$, the first BSA $30_a$, and/or the second BSA $30_b$. (It should be understood that the dual-mode location system 32 may alternatively be integrated together in whole or in part with one or more of the location entities). In turn, the location entities may communicatively couple to access networks, such as the first access network $14_a$ and the second access network $14_b$. The location system interface 164 may take the form of an Ethernet network interface module, a chipset and antenna adapted to facilitate wireless communication according a desired protocol, and/or any other form that provides for wireless and/or wired communication with location entities. The location system interface 164 may also include multiple location system interfaces, such as one location system interface for each location entity to which the dual-mode location system 32 is coupled. Other configurations are also possible.

The profile database interface 166 preferably functions to communicatively couple the dual-mode location system 32 to the profile database 34. (It should be understood that the dual-mode location system 32 may alternatively be integrated together with the profile database 34). As such, the profile database interface 166 may take the form of an Ethernet network interface module, a chipset and antenna adapted to facilitate wireless communication according a desired protocol, and/or any other form that provides for wireless and/or wired communication with the profile database 34. Other configurations are also possible. In one example, two or more of the dual-mode location system's communication interfaces, including the requesting entity interface 162, the location system interface 164, and/or the profile database interface 166, may be integrated together in whole or in part.

The processor 168 may comprise one or more general purpose microprocessors and/or dedicated signal processors. (The term "processor" encompasses either a single processor or multiple processors that could work in combination.) Data storage 170, in turn, may comprise memory and/or other storage components, such as optical, magnetic, organic or other memory or disk storage, which can be volatile and/or non-volatile, internal and/or external, and integrated in whole or in part with the processor 168. Data storage 170 preferably contains or is arranged to contain (i) program data 174 and (ii) program data 174. Although these components are described herein as separate data storage elements, the elements could just as well be physically integrated together or distributed in various other ways. In a preferred example, the program data 174 would be maintained in data storage separate from the program logic 176, for easy updating and reference by the program logic 176.

In one example, the dual-mode location system 32 may be a separate entity from the single-mode location systems, in which case the dual-mode location system's processor 168 and/or data storage 170 will be separate elements from the single-mode location systems' processor and/or data storage. In another example, the dual-mode location system 32 may be integrated together with one or more single-mode location systems, such as the first location system $24_a$ and/or the second location system $24_b$, in which case the dual-mode location system's processor 168 and/or data storage 170 may be integrated together in whole or in part with the single-mode location systems' processor and/or data storage.

Program data 174 may contain incoming location requests received via the requesting entity interface 162. For example, program data 174 may contain low precision requests and/or high precision requests. As another example, program data 174 may contain location requests for single-mode devices and/or dual-mode devices. As yet another example, program data 174 may contain location requests that need to be processed by the first location system $24_a$ and/or the second location system $24_b$. Other examples are possible as well.

Program data 174 may also contain data obtained from the location systems $24_a$ and $24_b$. For example, program data 174 may contain a low precision indication of a given WCD's location, such as data indicating a sub-coverage area of the first access network $14_a$ and/or the second access network $14_b$ in which a given WCD 12 is operating. As another example, program data 174 may contain a high precision indication of a given WCD's location, such as a geographic location of the given WCD 12 itself. In either case, program data 174 may also contain an indication of a method used by a given location system to determine a given WCD's location.

Program data 174 may further contain data obtained from the BSAs $30_a$ and $30_b$. For example, program data 174 may contain parameters for sub-coverage areas of the first access network $14_a$ and/or the second access network $14_b$. More particularly, for each sub-coverage area, program data 174 may include an identifier of the sub-coverage area, such as a carrier frequency, a PN offset, and/or corresponding base station's identifier, and an indication of the sub-coverage area's location, such as a centroid location, a radius, an antenna azimuth, a beam width, and/or a corresponding base station's geographic location. Other examples are possible as well. The dual-mode location system 32 may then use these sub-coverage area parameters to calculate an overlapping area of two sub-coverage areas.

Program data 174 may additionally contain data obtained from the profile database 34. For example, program data 174 may contain, for a given WCD 12, one or more identifiers of (a) the WCD (e.g., MSID, MAC ID, etc.), (b) a user of the given WCD 12 (e.g., a subscriber name), (c) each air-interface protocol over which the WCD is capable of communicating, and (d) each access network in which the given WCD 12 is provisioned to operate and/or registered. Other examples are possible as well. The dual-mode location system 32 may then use this data to determine whether a given WCD 12 is operating as a dual-mode device.

Program logic 176 preferably comprises machine language instructions that may be executed or interpreted by processor to carry out functions according to examples of the present invention. It should be understood, however, that the program logic 176 and its associated functions are described herein by way of example only. As such, those skilled in the art will appreciate that other program logic 176 and/or functions may be used instead, some program logic 176 and/or functions may be added, and some program logic 176 and/or functions may be omitted altogether. Further, the various functions described herein can be embodied in software, hardware, and/or firmware.

The program logic 176 may be executable by the processor 168 to handle location requests received via the requesting entity interface 162. For example, the program logic 176 may be executable by the processor 168 to cause the dual-mode location system 32 to (a) receive a location request for a given WCD 12 from a requesting entity via the requesting entity interface 162, (b) determine whether the given WCD 12 is operating as a dual-mode device (e.g., by querying the profile database 34 via the profile database interface 166), (c) route location requests to the appropriate location system(s) 24, and (d) send a determined indication of the given WCD's location to a requesting entity via the requesting entity interface 162.

The program logic 176 may also be executable by the processor 168 to determine a low precision indication of a dual-mode WCD's location. For example, the program logic 176 may be executable by the processor 168 to cause the dual-mode location system 32 to (a) identify a first sub-coverage area of the first access network 14$_a$ in which the given WCD 12 is located (e.g., by requesting and receiving from first location system 24$_a$ an indication of the first sub-coverage area), (b) identify a second sub-coverage area of the second access network 14$_b$ in which the given WCD 12 is located (e.g., by requesting and receiving from the second location system 24$_b$ an indication of the second sub-coverage area), (c) determine an overlapping area between the first sub-coverage area and the second sub-coverage area, (d) determine an indication of a location of the overlapping area, and (e) define the indication of the overlapping area's location as an indication of the given WCD's location. The program logic 176 may be executable by the processor 168 to carry out other functions as well.

Exemplary embodiments of the present invention have been described above. Those skilled in the art will understand, however, that changes and modifications may be made to the embodiments described without departing from the true scope and spirit of the present invention, which is defined by the claims.

I claim:

1. A method for determining a location of a wireless communication device (WCD), wherein the WCD is provisioned to operate in (a) a first access network that defines a first plurality of coverage areas and (b) a second access network that defines a second plurality of coverage areas, the method comprising:
    a dual-mode location system receiving, from a requesting entity, a first request seeking a high-precision indication of a location of the WCD;
    in response to receiving the first request, the dual-mode location system sending, to a first location system coupled to the first access network, a second request seeking the high-precision indication of the location of the WCD;
    as a result of sending the second request, the dual-mode location system receiving from the first location system an indication of a first coverage area of the first access network in which the WCD is located;
    the dual-mode location system identifying that the first location system failed to determine the high precision indication of the location of the WCD;
    the dual-mode location system sending, to a second location system coupled to the second access network, a third request seeking a low-precision indication of the location of the WCD;
    as a result of sending the third request, the dual-mode location system receiving from the second location system an indication of a second coverage area of the second access network in which the WCD is located;
    in response to the identifying, the dual-mode location system determining an overlapping area between the first coverage area and the second coverage area;
    the dual-mode location system determining an indication of a location of the overlapping area;
    the dual-mode location system defining the indication of the location of the overlapping area as an indication of the location of the WCD; and
    the dual-mode location system sending the defined indication of the location of the WCD to the requesting entity.

2. The method of claim 1, further comprising:
    the dual-mode location system determining that the WCD is provisioned to operate in the first access network and the second access network, wherein the sending of the second request occurs in response to determining that the WCD is provisioned to operate in the first access network and the second access network.

3. The method of claim 1, wherein the sending of the third request occurs in response to identifying that the first location system failed to determine the high precision indication of the location of the WCD.

4. The method of claim 1, wherein the first request seeking a high-precision indication of the location of the WCD comprises a request seeking an indication of a geographic position of the WCD.

5. The method of claim 1, where identifying that the first location system failed to determine the high precision indication of the location of the WCD comprises:
    determining that the indication received from the first location system is not a high-precision indication.

6. The method of claim 1, wherein the indication of the location of the overlapping area comprises an indication of a geographic location of a centroid of the overlapping area.

7. The method of claim 1, where the first access network comprises a Code Division Multiple Access (CDMA) network, and wherein the second access network comprises a WiMAX network.

8. The method of claim 1, wherein the first plurality of coverage areas substantially overlaps the second plurality of coverage areas.

9. The method of claim 1, wherein the determined overlapping area is smaller than both the first coverage area and the second coverage area.

10. The method of claim 1, wherein determining the overlapping area between the first coverage area and the second coverage area comprises:
    using the indication of the first coverage area to obtain parameters for the first coverage area;
    using the indication of the second coverage area to obtain parameters for the second coverage area;
    calculating the overlapping area based on the parameters for the first coverage area and the parameters for the second coverage area.

11. The method of claim 10, wherein:
    using the indication of the first coverage area to obtain parameters for the first coverage area comprises using the indication of the first coverage area to obtain data for the first coverage area from a first base station almanac; and
    using the indication of the second coverage area to obtain parameters for the second coverage area comprises using the indication of the second coverage area to obtain data for the second coverage area from a second base station almanac.

12. A dual-mode location system comprising:
    a first communication interface coupled to a requesting entity via one or more networks;
    a second communication interface coupled to a first location system and a second location system, wherein the first location system couples to a first access network that defines a first plurality of coverage areas, and wherein the second location system couples to a second access network that defines a second plurality of coverage areas;
    a processor;

data storage; and program instructions stored in the data storage and executable by the processor to cause the dual-mode location system to:

receive, from the requesting entity via the first communication interface, a first request seeking a high-precision indication of a location of the WCD, wherein the WCD is registered in the first access network and the second access network, send to the first location system via the second communication interface a second request seeking the high-precision indication of the location of the WCD, as a result of sending the second request, receive from the first location system via the second communication interface an indication of a first coverage area of the first access network in which the WCD is located, identify that the first location system failed to determine the high precision indication of the location of the WCD, send to the second location system via the second communication interface a request seeking a low-precision indication of the location of the WCD, as a result of sending the third request, receive from the second location system via the second communication interface an indication of a second coverage area of the second access network in which the WCD is located, in response to the identifying, determine an overlapping area between the first coverage area and the second coverage area, determine an indication of a location of the overlapping area, define the indication of the location of the overlapping area as an indication of a location of the WCD; and send the defined indication of the location of the WCD to the requesting entity via the first communication interface.

13. The dual-mode location system of claim 12, further comprising:

a third communication interface coupled to a profile database; and program instructions stored in the data storage and executable by the processor to cause the dual-mode location system to:

determine, based on data obtained from the profile database via third communication interface, that the WCD is registered in the first access network and the second access network.

\* \* \* \* \*